United States Patent
Mathrubootham et al.

(10) Patent No.: US 9,195,724 B2
(45) Date of Patent: Nov. 24, 2015

(54) ASSOCIATING OBJECTS IN MULTI-TENANT SYSTEMS

(75) Inventors: Ganesh Mathrubootham, Fremont, CA (US); Qian Lu, San Francisco, CA (US); Lu Ping Chen, Walnut Creek, CA (US); Shahid H. Khatri, Fremont, CA (US); Hui Fung Herman Kwong, San Francisco, CA (US); Kayvaan Ghassemieh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 906 days.

(21) Appl. No.: 13/369,858

(22) Filed: Feb. 9, 2012

(65) Prior Publication Data

US 2013/0031496 A1    Jan. 31, 2013

Related U.S. Application Data

(60) Provisional application No. 61/512,109, filed on Jul. 27, 2011.

(51) Int. Cl.
  *G06F 3/048* (2013.01)
  *G06F 17/30* (2006.01)

(52) U.S. Cl.
  CPC .......... *G06F 17/30557* (2013.01); *G06F 3/048* (2013.01)

(58) Field of Classification Search
  CPC ........................................ G06F 3/048
  USPC ......................................... 715/764
  See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |

(Continued)

*Primary Examiner* — Angie Badawi
(74) *Attorney, Agent, or Firm* — Ingrassia Fisher & Lorenz, P.C.

(57) ABSTRACT

Methods and systems are provided for associating objects in a database. An exemplary method involves identifying one or more objects in the database that are likely to be related to a first object in the database that is based on data obtained from a local application associated with a user and displaying the identified objects on a client device associated with the user. In exemplary embodiments, the identified objects are displayed in response to selection of a graphical user interface element enabling indication of a second object from among the one or more objects, wherein the first object is associated with the second object in the database after receiving indication of the second object. In one or more exemplary embodiments, the database is a multi-tenant database in a multi-tenant system providing instances of a virtual application to multiple tenants.

18 Claims, 8 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,024,234 B1 * | 9/2011 | Thomas et al. ............ 705/26.61 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0235829 A1 * | 10/2006 | Mirzad et al. ..................... 707/3 |
| 2009/0324137 A1 * | 12/2009 | Stallings et al. .............. 382/306 |
| 2012/0060096 A1 * | 3/2012 | Makam et al. ................ 715/736 |

* cited by examiner

FIG. 8

ASSOCIATING OBJECTS IN MULTI-TENANT SYSTEMS

CROSS-REFERENCE TO RELATED APPLICATION(S)

This application claims the benefit of U.S. provisional patent application Ser. No. 61/512,109, filed Jul. 27, 2011, the entire content of which is incorporated by reference herein.

TECHNICAL FIELD

Embodiments of the subject matter described herein relate generally to computer systems and networks configured to support applications executing on behalf of multiple tenants, and more particularly, embodiments of the subject matter relate to methods and systems for associating objects in a multi-tenant database.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In practice, users will often utilize different applications to accomplish different tasks. In this regard, an individual user may utilize a virtual application provided over a network to create and manage records in a multi-tenant database on the network while utilizing another application to perform various other activities and maintain other information. For example, a user may utilize an e-mail application to e-mail individuals associated with an account having information stored in the multi-tenant database or to manage tasks, meetings, or other activities related to that account. However, it can be difficult for users to mentally maintain the association between the information in the multi-tenant database and other activities and/or information associated with local applications. Accordingly, it is desirable to create and maintain associations between data in the multi-tenant database and a user's activities and/or other information from the user's local applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 4-8 illustrate exemplary displays that may be presented on a client computing device in the multi-tenant system of FIG. 1 and/or the object association system of FIG. 2 in connection with the association process of FIG. 3 in accordance with one or more exemplary embodiments.

DETAILED DESCRIPTION

Figure 1:
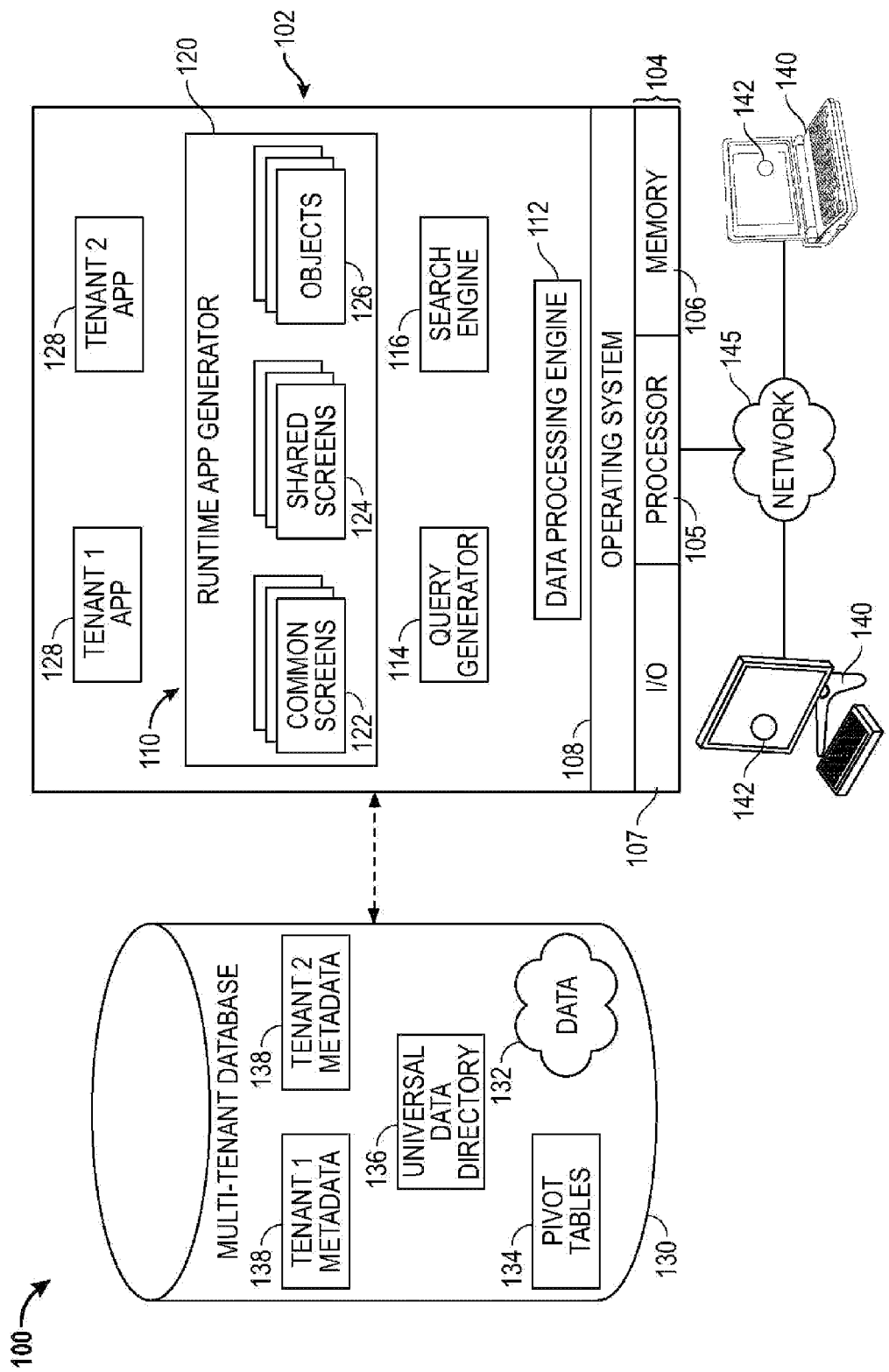
FIG. 1 is a block diagram of an exemplary multi-tenant system.

Embodiments of the subject matter described herein generally relate to identifying and displaying objects in a multi-tenant database that may be related to an object created based on a user's activity with respect to a local application and providing graphical user interface (GUI) elements adapted to allow the user to select, from the identified database objects, those database objects that the user would like to associated with the activity object in the multi-tenant database. In this manner, existing database objects that are likely to be related to the object based on the user's external activity are recommended to the user in a manner that allows the user to quickly and easily view the recommended objects and select the existing database object the user would like to associated with a previously unassociated activity object.

As described in greater detail below, in exemplary embodiments, data and/or information pertaining to a user's activity with respect to a local application that is external to and/or independent of the multi-tenant system and executing on a computing device associated with that user are automatically captured and stored in the multi-tenant database as activity objects. Subsequently, the user may utilize a virtual application to view an activity object in the multi-tenant database that is not associated with any other database objects, wherein the virtual application provides or otherwise presents a GUI element enabling the user to indicate a primary database object that the user would like to associate with that activity object. Based on the primary database object indicated by the user, the virtual application automatically queries the multi-tenant database to identify additional database objects that are associated with the primary database object, and therefore, likely to be related to the activity object. After identifying these additional database objects, the virtual application provides or otherwise presents a GUI element enabling the user to select a secondary database object that the user would like to associate with the activity object from among the recommended database objects identified by the virtual application. In this manner, the virtual application exploits the relationship between the primary database object and other database objects to recommend other database objects for association and reduce the workload on the user when creating associations between previously unassociated activity objects and various existing database objects.

Once the user manipulates the GUI elements to select or otherwise identify the primary and secondary database objects the user would like to associate with the previously unassociated activity object, the virtual application may automatically update one or more fields of the activity object and/or the selected database objects in the multi-tenant database to indicate, and thereby maintain, the association between the objects in the multi-tenant database. Thus, when the user subsequently views one of the objects, the virtual application may identify its associated objects, obtain information pertaining to its associated objects, and display that information concurrently to displaying the information pertaining to the selected object, thereby graphically indicating to the user the association (or relationship) between the objects in the multi-tenant database.

Turning now to FIG. 1, an exemplary multi-tenant system 100 suitably includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the multi-tenant system 100. In accordance with one non-limiting example, the multi-tenant system 100 is implemented in the form of a multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by the virtual application 128 (e.g., via query generator 114).

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media (not separately shown) that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client application 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128. For example, a virtual application 128 may include a number of objects 126 accessible to a tenant, wherein for each object 126 accessible to the tenant, information pertaining to its object type (e.g., "contact," "lead," "account," "case," "opportunity," "activity," or the like, or a custom and/or tenant-specific object type) along with values for various fields associated with that respective object type are maintained as metadata 138 in the database 130. In this regard, the object type defines the structure (e.g., the formatting, functions and other constructs) of each respective object 126 and the various fields associated therewith. Each object type may include one or more fields for indicating the relationship of a respective object of that object type to one or more objects of a different object type (e.g., master-detail, lookup relationships, or the like). For example, in a CRM application, the opportunity object type may include one or more fields for indicating which objects of other object types are associated with a respective opportunity object. In other words, the opportunity object type includes one or more fields indicating which, if any, objects of other object types are associated that respective opportunity object. For convenience, but without limitation, the field(s) of an object type that indicates the relationship(s) of a respective object of that object type to objects of other object types may alternatively be referred to herein as the object-association field(s).

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client application 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. The query generator 114 suitably obtains requested subsets of data 132 from the database 130 as needed to populate the tables, reports or other features of the particular virtual application 128.

Figure 2:
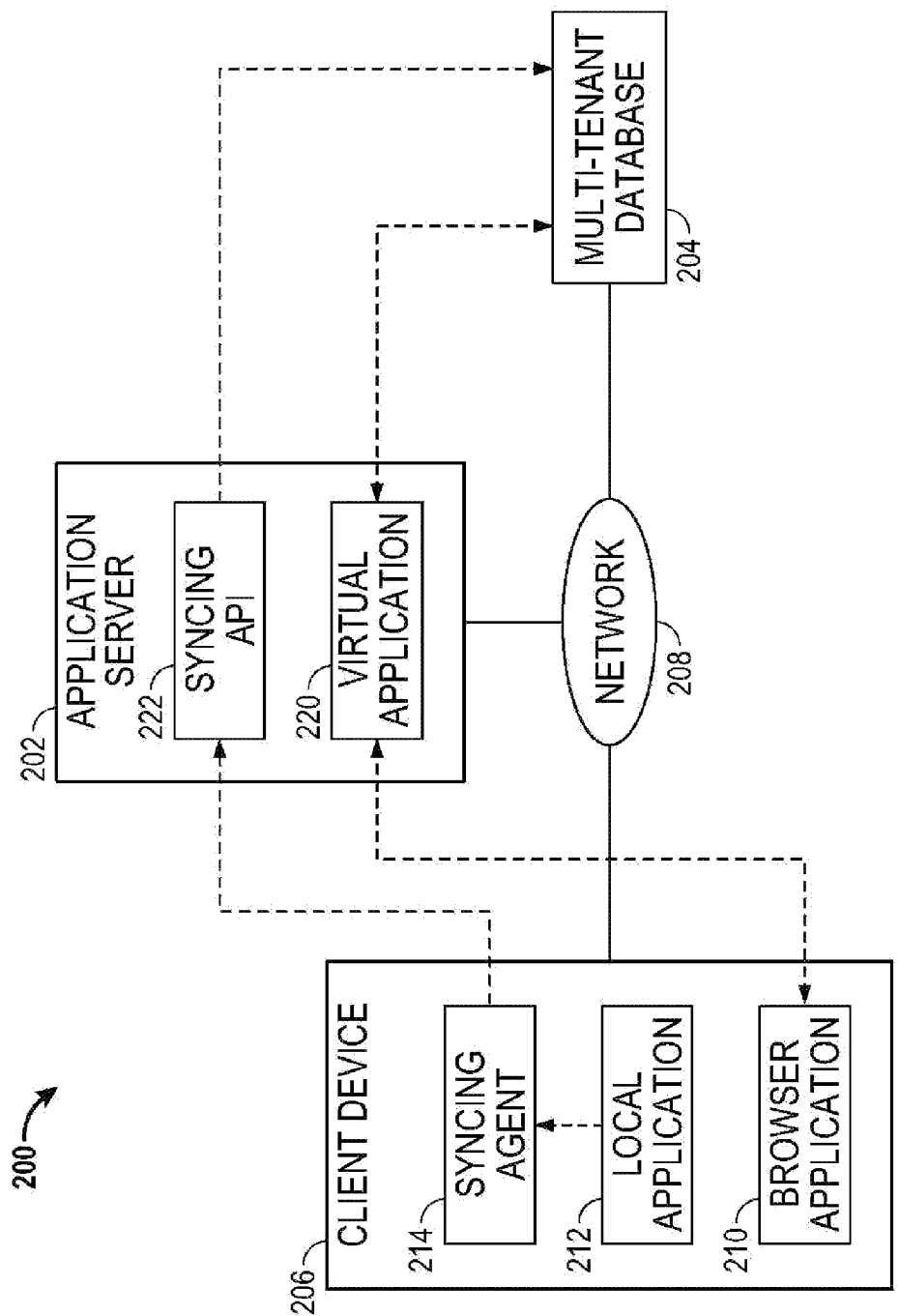
FIG. 2 is a block diagram of an exemplary object association system suitable for use with the multi-tenant system of FIG. 1 in accordance with one or more embodiments.

FIG. 2 illustrates an exemplary object association system 200 suitable for use with and/or implementation by a multi-tenant computing system, such as the multi-tenant system 100. The illustrated system 200 includes an application server 202 (e.g., server 102), a multi-tenant database 204 (e.g., database 130), a client computing device 206 (e.g., client device 140), and a communications network 208 (e.g., network 145). The communications network 208 may be realized as any wired and/or wireless computer network that supports communications between the application server 202, the multi-tenant database 204, and the client device 206. It will be appreciated that FIG. 2 is a simplified representation of the object association system 200 for purposes of explanation and is not intended to limit the subject matter in any way.

In exemplary embodiments, a user of the client computing device 206 operates or otherwise causes the client computing device 206 to execute an application (or program) 210, such as a web browser, to access the application server 202, wherein the application server 202 generates or otherwise supports an instance of a virtual application 220 (e.g., virtual application 128) that is provided to the client device 206 via the network 208 and presented or otherwise displayed within the browser application 210 executing on the client device 206. The user of the client device 206 may subsequently utilize the virtual application 220 to view, analyze, modify or otherwise utilize data maintained by the multi-tenant database 204 that is associated with the user's tenant and accessible to the user (e.g., based on the user's permissions within the multi-tenant system), as described above in the context of multi-tenant system 100 of FIG. 1.

In the illustrated embodiment of FIG. 2, the client device 206 executes or otherwise supports one or more additional local applications (or programs) 212 which are utilized by the user to perform various activities and maintain information independently of or otherwise external to the multi-tenant database 204. For example, a user may utilize an e-mail application (or program) or another personal information management application to send e-mails or other messages to other individuals via the network 208, create and/or manage tasks (e.g., using a task list feature or the like), schedule meetings or other events (e.g., using a calendar feature or the like), manage the user's contacts (e.g., using an address book feature), and/or maintain other information. In this regard, some of the data and/or information maintained and/or managed by the local application 212 or the user activities associated with the local application 212 may be relevant to data and/or information maintained by the multi-tenant database 204. For example, the user may send e-mails and schedule meetings using the local application 212 that are related to an "opportunity" object or "activity" object having data maintained in the multi-tenant database 204.

Still referring to FIG. 2, in an exemplary embodiment, the user of the client device 206 manipulates the browser application 210 to obtain or otherwise download and install a syncing agent 214 from the application server 202 on the client device 206, wherein the client device 206 executes or otherwise operates the syncing agent 214 in the background to periodically obtain activities, objects, items, or other pieces of data and/or information from the local application 212 and transmit the data and/or information obtained from the local application 212 to the multi-tenant database 204 via the application server 202. In accordance with one embodiment, the syncing agent 214 is a software module that is integrated with the local application 212, for example, as an add-in or plug-in software module installed with or otherwise integrated with the local application 212. For convenience, but without limitation, the activities or other data and/or information obtained from the local application 212 and provided to the multi-tenant database 204 via the syncing agent 214 may alternatively be referred to herein as foreign activity data.

In an exemplary embodiment, the application server 202 executes or otherwise supports a syncing application program interface (API) 222 that obtains foreign activity data from the local application 212 associated with the user of the client device 206 from the syncing agent 214 and stores the foreign activity data associated with the user in the multi-tenant database 204. In this regard, in exemplary embodiments, the syncing API 222 generates or otherwise creates an "activity" object in the multi-tenant database 204 having fields corresponding to the content of the foreign activity data. As described in greater detail below in the context of FIGS. 3-7, in exemplary embodiments, the virtual application 220 is configured to present or otherwise display GUI elements on the client device 206 (e.g., within the browser application 210 accessing the virtual application 220) that enable the user to indicate or otherwise establish associations between the "activity" objects based on the foreign activity data obtained from the local application 212 and other objects maintained by the multi-tenant database 204.

Figure 3:
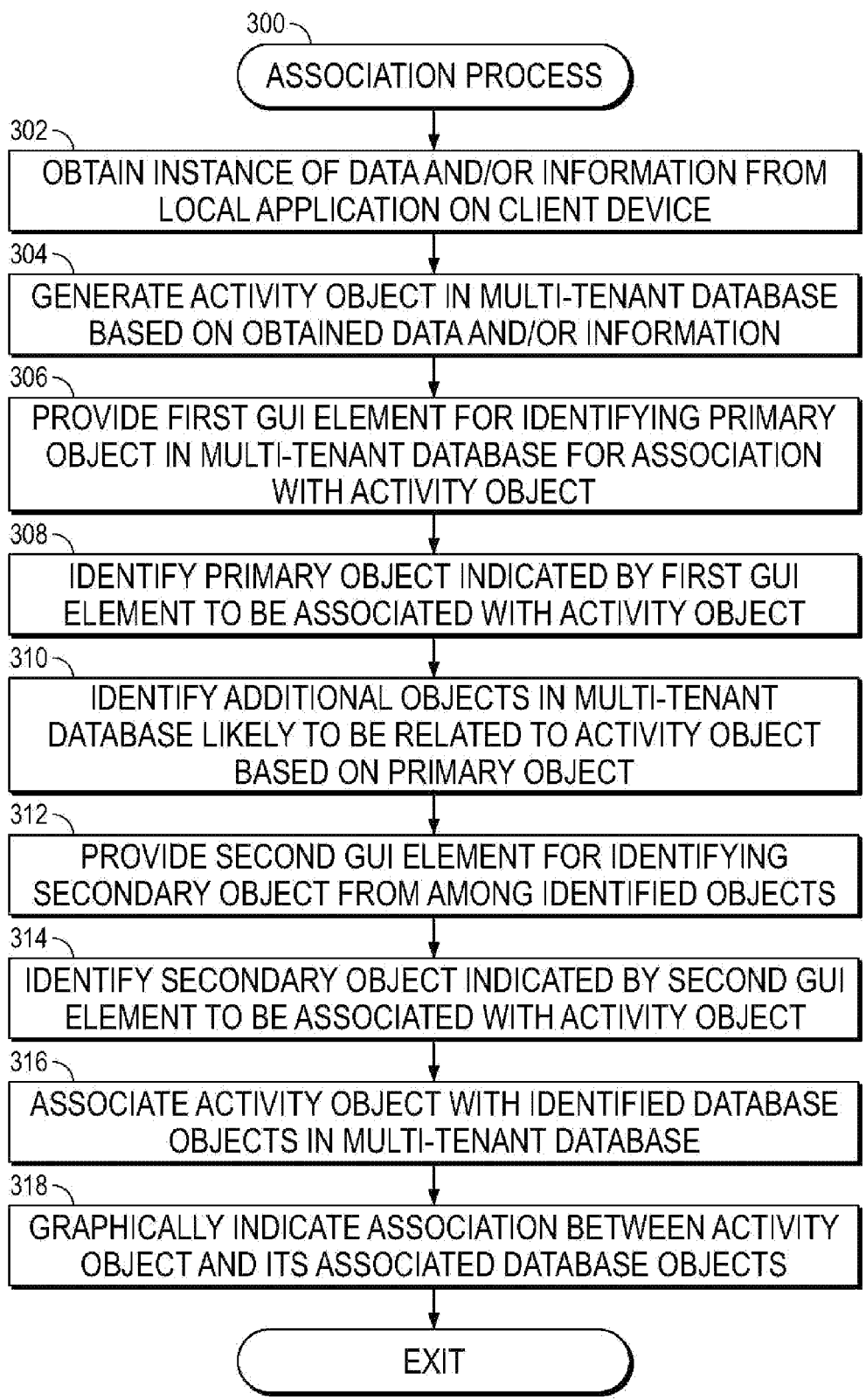
FIG. 3 is a flow diagram of an exemplary association process suitable for use with the multi-tenant system of FIG. 1 and/or the object association system of FIG. 2 in accordance with one or more exemplary embodiments.

FIG. 3 depicts an exemplary association process 300 suitable for implementation by a multi-tenant system to associate objects or other data obtained from a local application executing on a client device with objects and/or data maintained in a multi-tenant database. The various tasks performed in connection with the association process 300 may be performed by software, hardware, firmware, or any combination thereof. For illustrative purposes, the following description may refer to elements mentioned above in connection with FIGS. 1-2. In practice, portions of the association process 300 may be performed by different elements of the multi-tenant system 100 and/or the object association system 200, such as, for example, the application server 102, 202, the multi-tenant database 130, 204, the virtual application 128, 220, the client application 142, 210, the syncing agent 214, and/or the syncing API 222. It should be appreciated that the association process 300 may include any number of additional or alternative tasks, the tasks need not be performed in the illustrated order and/or the tasks may be performed concurrently, and/or the association process 300 may be incorporated into a more comprehensive procedure or process having additional functionality not described in detail herein. Moreover, one or more of the tasks shown and described in the context of FIG. 3 could be omitted from a practical embodiment of the association process 300 as long as the intended overall functionality remains intact.

Referring to FIG. 3, and with continued reference to FIGS. 1-2, in an exemplary embodiment, the association process 300 begins by receiving or otherwise obtaining data and/or information from a local application associated with a user that is executing on a client computing device and creating, instantiating, or otherwise generating an object in the multi-tenant database based on that obtained data and/or information (tasks 302, 304). In an exemplary embodiment, the syncing agent 214 automatically obtains, periodically, data and/or information corresponding to the user's activity with respect to the local application 212, such as, for example, data and/or information corresponding to the user's e-mails, tasks, events, meetings, appointments, or the like. The syncing agent 214 provides the foreign activity data obtained from the local application 212 to the syncing API 222 via the network 208, which, in turn, is configured to store the foreign activity data in the multi-tenant database 204 by generating, instantiating, or otherwise creating one or more "activity" objects in the multi-tenant database 204 based on the foreign activity data. In exemplary embodiments, the syncing agent 214 modifies one or more fields of the "activity" objects to indicate the user associated with the local application 212 (e.g., using the user's unique numerical identifier) and the user's associated tenant, such that the multi-tenant database 204 maintains an association between the "activity" objects based on the data obtained from the local application 212 on the client device 206 and the user of the client device 206 (or the user's tenant).

In an exemplary embodiment, the association process 300 continues by providing, presenting, or otherwise displaying one or more GUI elements adapted to allow the user to indicate, select, or otherwise identify a first object in the multi-tenant database that the user would like to associate with the "activity" object based on the foreign activity data (task 306). For convenience and ease of explanation, the first object to be associated with the "activity" object is alternatively referred to herein as the primary database object. As described in greater detail below in the context of FIG. 4, in an exemplary embodiment, after the syncing agent 214 and/or the syncing API 222 creates an "activity" object to the multi-tenant database 204, the user of the client device 206 manipulates or otherwise operates the instance of the virtual application 220 presented within the browser application 210 to view the user's "activity" objects that are not associated with other objects in the multi-tenant database 204. The virtual application 220 obtains information pertaining to unassociated "activity" objects associated with the user from the multi-tenant database 204 and presents or otherwise display a graphical representation of the unassociated "activity" objects within the browser application 210 along with one or more GUI elements adapted to allow the user to select objects in the multi-tenant database 204 that the user would like to associate with the unassociated "activity" object. In an exemplary embodiment, the GUI element(s) presented by the virtual application 220 are configured to allow the user to select, identify, or otherwise indicate a particular object type for the primary database object from a plurality of different object types accessible to the user and/or the user's tenant. For example, in accordance with one embodiment, the GUI element(s) enable the user to select or otherwise identify a particular type of person object, such as a "contact" object or a "lead" object, that the "activity" object should be associated with. The GUI element(s) also enable the user to select or otherwise indicate the particular database object of the selected object type that the user would like to associate with the unassociated "activity" object. In exemplary embodiments, the user utilizes an input device associated with the client device 206 (e.g., a mouse, keyboard, key pad, touch panel and/or touchscreen, or the like) to manipulate the GUI element(s) provided by the virtual application 220 to select or otherwise identify a particular database object of the primary object type to be associated with the unassociated "activity" object. For example, as described in greater detail below in the context of FIG. 4, the user may type the name of the individual that identifies the database object of the selected object type (e.g., the name of a particular contact) that the user would like to associate with the "activity" object.

In an exemplary embodiment, the association process 300 continues by identifying the primary database object selected or otherwise indicated by the user for association with the unassociated "activity" object, and after identifying the primary database object, identifying one or more additional objects in the multi-tenant database that are likely to be related to the "activity" object based on the primary database object (tasks 308, 310). For convenience and ease of explanation, an additional object in the multi-tenant database that a user would like to associate with the "activity" object is alternatively referred to herein as the secondary database object. In response to receiving indication of the selected primary database object, the virtual application 220 automatically queries the multi-tenant database 204 to identify additional objects associated with the user and/or the user's tenant that are also associated with the primary database object, and thus, may be related to the "activity" object based on the relationship between the "activity" object and the primary database object. In accordance with one embodiment, the possible secondary database objects identified by virtual application 220 have different object types than the primary database object that is to be associated with the "activity" object. For example, if the selected primary database object type corresponds to a person object type (e.g., a "contact," "lead," or the like), the virtual application 220 identifies business objects (e.g., "accounts," "opportunities," "cases," or the like) in the multi-tenant database 204 that are associated with the indicated person object as possible secondary database objects. In accordance with one or more embodiments, in addition to querying the multi-tenant database 204 for objects associated with the indicated primary database object, the virtual application 220 also identifies possible secondary database objects based on the content of the "activity" object. For example, if the "activity" object is an e-mail message, the virtual application 220 may parse the content of the e-mail message (e.g., the fields of the "activity" object) and identify any database objects referenced within the e-mail message. Thus, the possible secondary database objects identified by the virtual application 220 may include objects in the multi-tenant database 204 that are not associated with the primary database object.

After identifying secondary database objects that may be relevant to the "activity" object, the association process 300 continues by providing one or more GUI elements adapted to allow the user to indicate, select, or otherwise identify a secondary database object that the user would like to associate with the "activity" object from among a plurality of the possible secondary database objects (task 312). For example, the virtual application 220 may provide, present, or otherwise display, within the browser application 210, a GUI element (e.g., a drop-down list or the like), that, when selected by the user, displays a list containing entries corresponding to possible secondary database objects identified by the virtual application 220. In this regard, the displayed list of possible secondary database objects includes one or more entries corresponding to objects associated with the primary database object. For convenience, the displayed possible secondary database objects may alternatively be referred to herein as the recommended secondary database objects. In an exemplary embodiment, the recommended secondary database objects are limited to database objects accessible to the user of the client device 206 based on that user's permissions. For example, the user may not be able to view all of the database objects associated with the user's tenant, in which case, any database objects identified by the virtual application 220 as possible secondary database objects that are not accessible to the user are excluded from the list or otherwise prevented from being displayed on the client device 206.

In accordance with one or more embodiments, the virtual application 220 determines or otherwise identifies a subset of the possible secondary database objects identified by the virtual application 220 and displays only that subset of possible secondary database objects as the recommended secondary database objects within the list presented on the client device 206. For example, due to the size of the display device or other human factor considerations, the amount of possible secondary database objects capable of being displayed within the browser application 210 on the client device 206 may be limited to a particular number. In exemplary embodiments, when the number of possible secondary database objects identified by the virtual application 220 is greater than the number of database objects capable of being displayed, the virtual application 220 identifies a reduced subset of the possible secondary database objects for display to the user by excluding possible secondary database objects that are less likely to be relevant to the "activity" object from being displayed. In this regard, the virtual application 220 may identify or otherwise select the subset of possible secondary database objects that are most likely to be relevant based on various relevancy criteria, such as, for example, the level (or type) of association between a respective possible secondary database object and the primary database object, the relative importance (or value) of a respective possible secondary database object, and the like), the amount of activity (or number of other "activity" objects) associated with a respective possible secondary database object, the date and/time of most recent modifications to a respective possible secondary database object, a reference to a respective possible secondary database object within the content of the "activity" object, and the like. For example, for "account" objects, a parent account of a selected person object may be preferentially included in the displayed subset of possible secondary database objects over other "account" objects associated with the selected person object. For "opportunity" objects, opportunities having a greater potential value may be preferentially included in the displayed subset of possible secondary database objects over other "opportunity" objects having a lesser potential value.

In some embodiments, different types of possible secondary objects may be preferentially included in the recommended secondary database objects (i.e., the displayed subset of possible secondary database objects) over other object types. For example, "account" objects may be selected for inclusion in the recommended secondary database objects over "case" objects or "opportunity" objects, and "case" objects may be selected for inclusion in the recommended secondary database objects over "opportunity" objects. In accordance with one or more embodiments, the virtual application 220 determines the reduced subset of the possible secondary database objects for display to the user in a manner that achieves a substantially equal distribution across different secondary object types. For example, if the possible secondary database objects includes three different object types (e.g., "accounts," "opportunities," and "cases") and the number of possible secondary database objects capable of being displayed within the browser application 210 is equal to twelve, the virtual application 220 may identify and display recommended secondary database objects that includes four of the possible secondary database objects of each different object type (e.g., four "accounts," four "opportunities," and four "cases"). In this regard, when the number of possible secondary database objects identified for a particular object type exceeds the number of displayed objects allotted to that object type, the virtual application 220 may determine the most relevant possible secondary objects of that object type and exclude possible secondary objects of that object type that are less likely to be relevant, as described above. Conversely, when the number of possible secondary database objects of a particular object type is less than the number of displayed objects allotted to that object type or is otherwise insufficient to provide an equal distribution, the virtual application 220 may include additional possible secondary database objects of the other object types to ensure the maximum number of recommended secondary database objects is displayed to the user.

In yet other embodiments, each different object type may be allotted a particular number of entries in the displayed list of recommended secondary database objects. For example, a first object type (e.g., "accounts") may be allotted a first number of displayed objects and a second object type (e.g., "opportunities") may be allotted a greater and/or lesser number of displayed objects. Thus, the virtual application 220 may exclude more or less of one object type in favor of another object type when identifying the subset of possible secondary database objects for display. In some embodiments, the virtual application 220 may determine the number of displayed objects allotted to each object type based on the primary object type (i.e., the object type of the primary database object). For example, when the primary database object is a "contact" object, the virtual application 220 may determine a greater number of "account" objects should be displayed than when the primary database object is a "lead" object, because leads are less likely to be associated with existing accounts. It will be appreciated that there are numerous different criteria and algorithms that may be utilized to determine a particular subset of objects for display, and in practice, the criteria and algorithms utilized to determine a particular subset of objects for display will vary to suit the needs of a particular implementation. Accordingly, the subject matter described herein is not intended to be limited to a particular manner for identifying a subset of possible secondary database objects for display to the user.

Still referring to FIG. 3, in an exemplary embodiment, the association process 300 continues by identifying the secondary database object selected or otherwise indicated by the user from among the recommended secondary database objects and associating the "activity" object with the identified primary database object and the identified secondary database object in the multi-tenant database (tasks 314, 316). In a similar manner as described above, the user of the client device 206 manipulates the GUI element(s) provided by the virtual application 220 to select, indicate, or otherwise identify a particular secondary database object of the displayed subset of possible secondary database objects that the user would like to associate with the "activity" object. After selecting the desired secondary database object, the user may manipulate or otherwise select another GUI element, such as a button, to indicate that the desired primary and secondary database objects have been selected and that the "activity" object should be associated with the selected database objects in the multi-tenant database 204. After receiving indication that the desired primary and secondary database objects have been selected, the virtual application 220 automatically configures or otherwise modifies the object-association fields of the "activity" object in the multi-tenant database 204 to indicate the association with the primary database object and the secondary database object, such that the multi-tenant database 204 maintains the association between the "activity" object and the selected database objects. For example, virtual application 220 may modify a contact association field of the "activity" object to indicate the "contact" object selected by the user (e.g., by setting the contact association field to be equal to a numerical identifier corresponding to the "contact" object) and modify an "opportunity" association field of the "activity" object to indicate the "opportunity" object selected by the user. In some embodiments, the virtual application 220 may also configure or otherwise modify the selected database objects in the multi-tenant database 204 to indicate their association with the "activity" object. For example, virtual application 220 may modify an activity association field of a "contact" object selected by the user to indicate the "activity" object.

As described in greater detail below in the context of FIG. 8, in accordance with one or more embodiments, the association process 300 graphically indicates the association between an "activity" object and its associated database objects maintained in the multi-tenant database (task 316). For example, the user of the client device 206 may utilize the virtual application 220 to view the "activity" object in the multi-tenant database 204, wherein the virtual application 220 obtains the "activity" object from the multi-tenant database 204 and displays a graphical representation of the "activity" object that includes information pertaining to the "activity" object (e.g., a portion of its content, or the like) along with information pertaining to its associated database objects (e.g., the names of its associated database objects). In this manner, an "activity" object and information pertaining to its associated database objects may be concurrently displayed to the user by the virtual application 220 within the browser application 210 on the client device 206. In a similar manner, the user of the client device 206 may utilize the virtual application 220 to view a database object that has an "activity" object associated with it, wherein the virtual application 220 displays a graphical representation of the database object that includes information pertaining to its associated "activity" object.

FIGS. 4-7 illustrate an exemplary sequence of a display 400 graphically presented by a virtual application 220 within a browser application 210 executing on a client device 206 in connection with an exemplary embodiment of the association process 300 of FIG. 3. In this regard, the displays illustrated in FIGS. 4-7 represent a portion of the visual area on the electronic display device associated with client device 206 that contains graphical representations or images associated with the browser application 210 which generates, conveys, renders, or otherwise displays graphical representations or images based on data received from the virtual application 220. In practice, the display 400 may be realized as or otherwise derived from one or more screens (e.g., screens 122, 124) integrated with or otherwise supported by the virtual application 220.

Figure 4:
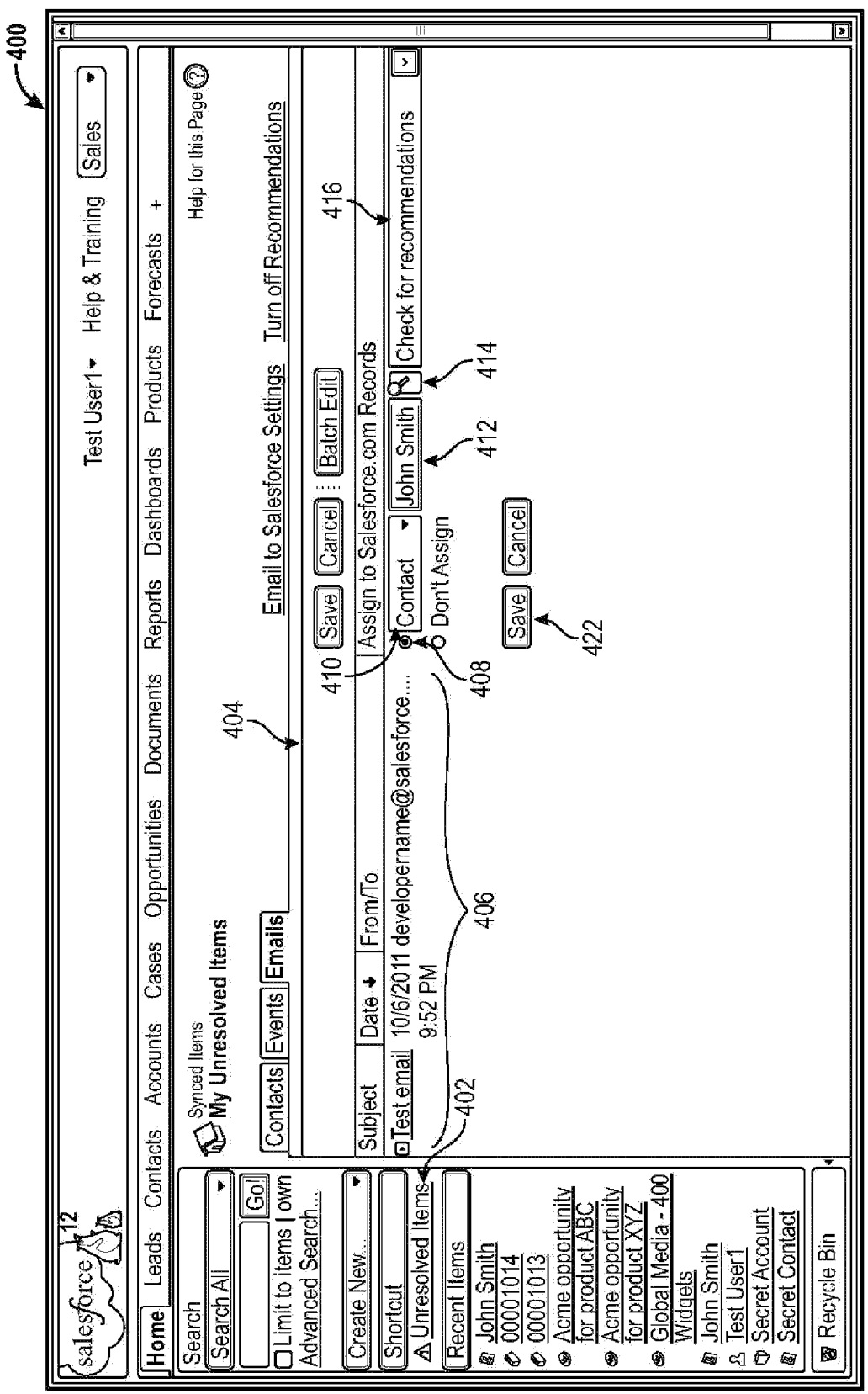

Referring to FIG. 4, in an exemplary embodiment, the virtual application 220 provides, presents, or otherwise displays a GUI element 402, such as a hyperlink, that, when selected by the user of the client device 206, causes the virtual application 220 to present a list 404 of the user's unassociated "activity" objects (e.g., "Unresolved Items") within the display 400. In the illustrated embodiment, the virtual application 220 displays, within the list 404, an entry 406 for an unassociated "activity" object based on foreign activity data corresponding to an e-mail sent or received via the local application 212. The entry 406 that includes identifying information pertaining to the e-mail (e.g., the value of the subject, date, sender and/or other fields of the e-mail activity object) along with a GUI element 408, such as a radio button, which the user may select to enable associating the unassociated e-mail "activity" object with one or more other objects maintained by the multi-tenant database 204. When the radio button 408 is selected, the virtual application 220 presents or otherwise displays, within the entry 406, a GUI element 410, such as a drop-down list, that enables a user to select a primary object type for a primary database object to be associated with the e-mail "activity" object. In an exemplary embodiment, the drop-down list 410 allows the user to select among different person object types, such as "contact" objects, "lead" objects, and the like. The virtual application 220 also presents or otherwise displays another GUI element 412, such as a text box, that enables a user to identify or otherwise indicate the primary database object of the selected primary object type that the user would like to associate with the e-mail "activity" object. The user may utilize the text box 412 to provide the name or other identifier for the contact to be associated with the e-mail, or the user may select another GUI element 414 displayed by the virtual application 220 that corresponds to a search feature, which the user may utilize to query the multi-tenant database 204 for a particular object of the selected object type. In some embodiments, the virtual application 220 may automatically identify a person object associated with the e-mail based on the content of the e-mail (e.g., by parsing the body or header of the e-mail and identifying reference to an individual corresponding to a "contact" object in the multi-tenant database 204) and automatically display the name of the individual corresponding to the identified person object in the text box 412 as a suggested primary database object for association with the e-mail. In this regard, in some embodiments, the user may not need to manipulate the GUI elements 412, 414 to select a primary database object when the virtual application 220 automatically identifies the primary database object that the user would like to associate with the "activity" object.

Figure 5:
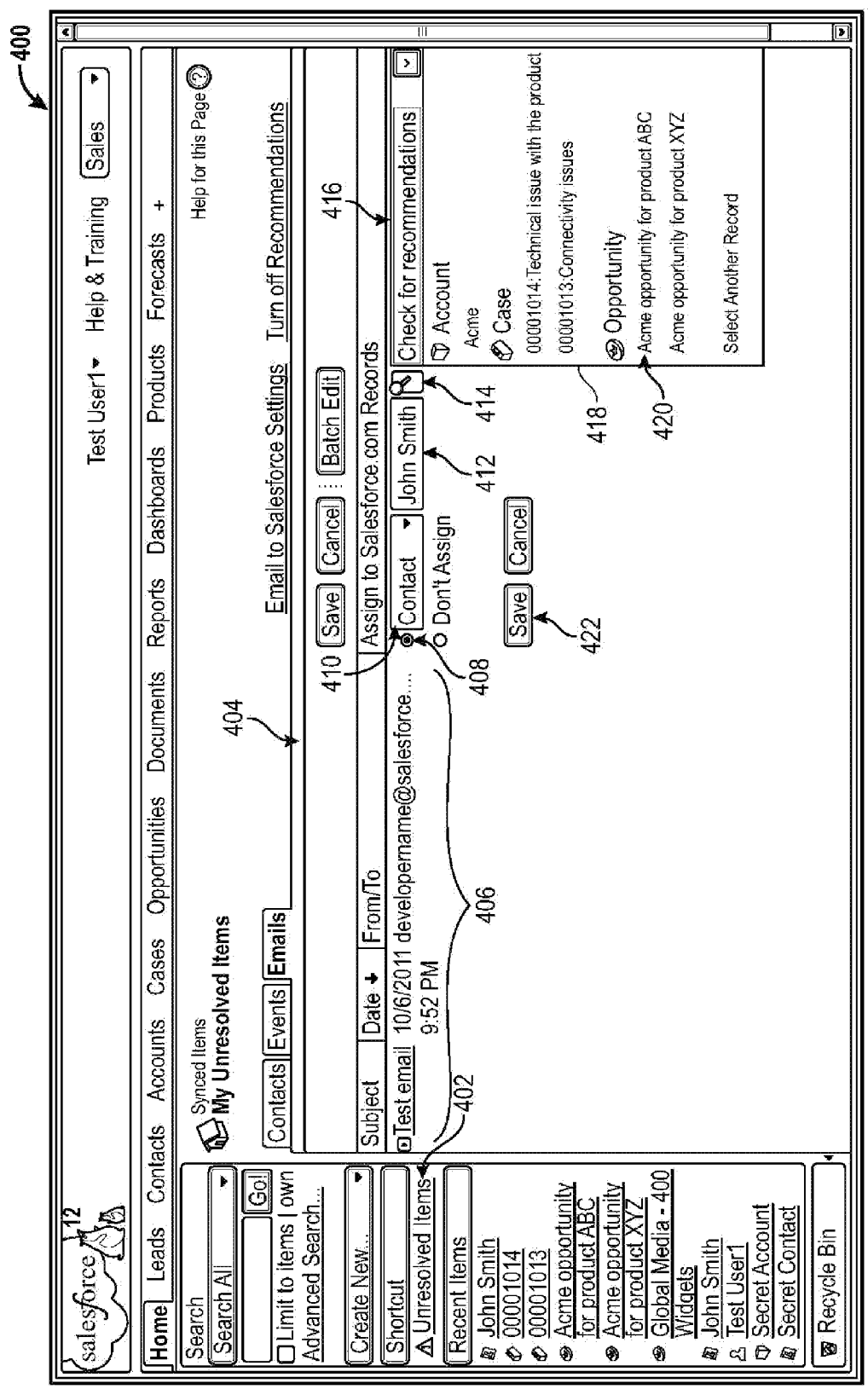
Figure 6:
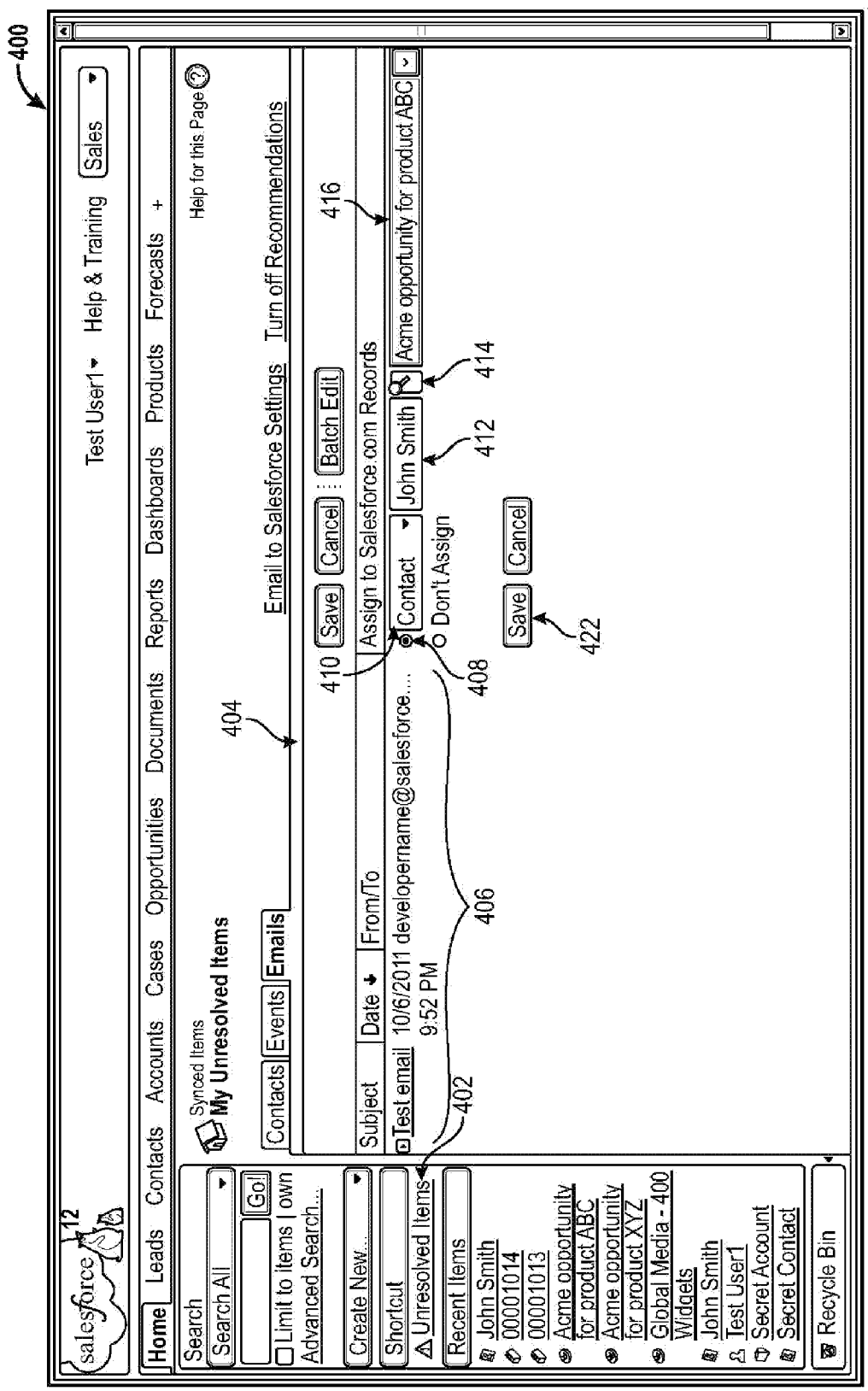
Figure 7:
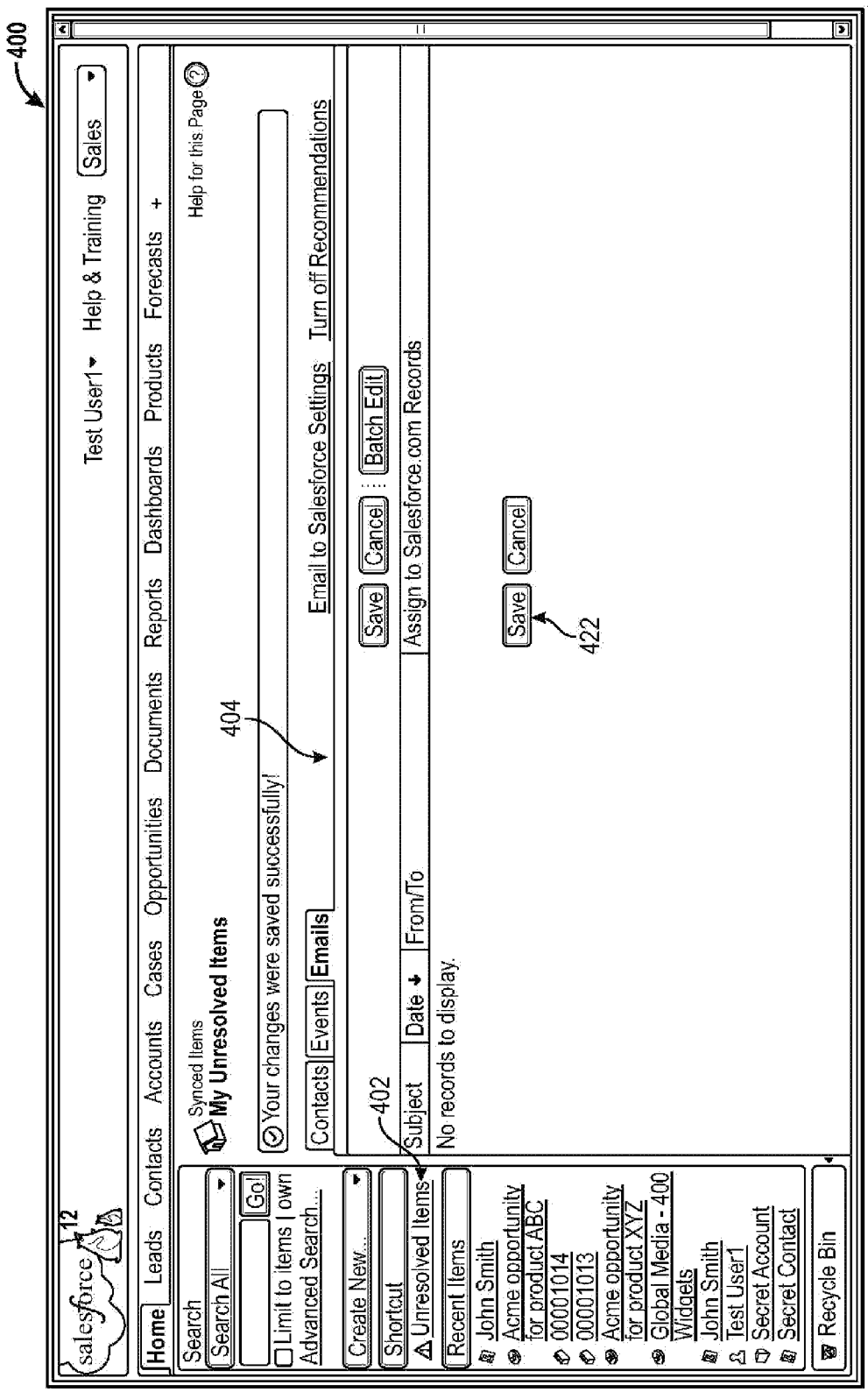

Turning now to FIGS. 5-7 and with continued reference to FIG. 4, in an exemplary embodiment, the virtual application 220 provides, presents, or otherwise displays another GUI element 416, such as a drop-down list, adapted to allow a user to select a secondary database object to be associated with the e-mail. As described above in the context of FIG. 3, the virtual application 220 automatically queries the multi-tenant database 204 for business objects (e.g., "opportunity" objects, "activity" objects, "case" objects, and the like) that are associated with the person object (e.g., the "John Smith" "contact" object) identified or otherwise selected by the user using the GUI elements 410, 412. Additionally, in some embodiments, the virtual application 220 may search the content of the e-mail for reference to other objects that are likely to be associated with the e-mail. When the drop-down list 416 is selected by the user, the virtual application 220 presents or otherwise displays a list 418 that includes a recommended subset of the possible secondary database objects identified by the virtual application 220 that are likely to be associated with the e-mail. As described above in the context of FIG. 3, in an exemplary embodiment, the list 418 includes the most relevant subset of possible secondary database objects for the different secondary object types identified based on various relevancy criteria (e.g., the parent account of the "John Smith" "contact" object, the "opportunity" objects associated with the "John Smith" "contact" object having the greatest potential value, and the like). When the user selects an entry 420 corresponding to the desired secondary database object from the list 418, the virtual application 220 removes the list 418 of recommended secondary database objects from the display 400 and automatically updates the drop-down list 416 to indicate or otherwise identify the selected secondary database object, as illustrated in FIG. 6. It should be noted that in various embodiments, the drop-down list 416 may not be displayed on the display 400 until the GUI elements 410, 412 unambiguously identify a primary database object, or the drop-down list 416 may not be displayed on the display 400 until at least one possible secondary database object associated with the primary database object indicated by the GUI elements 410, 412 is identified by the virtual application 220.

Once the user is satisfied with the primary database object identified by the text box 412 and the secondary database object identified by the drop-down list 416, the user selects another GUI element 422, such as a button, displayed by the virtual application 220 to cause the virtual application 220 to make the association between the previously unassociated e-mail "activity" object and the identified database objects. In response to selection of the button 422, the virtual application 220 associates the "activity" object and the selected database objects in the multi-tenant database 204 and removes the entry 406 for the previously unassociated "activity" object from the list 404 on the display 400, as illustrated by FIG. 7. For example, as described above, the virtual application 220 modifies the contact association field and the opportunity association field of the e-mail "activity" object maintained by the multi-tenant database 204 to indicate that the "Test email" e-mail is associated with contact "John Smith" and the "Acme opportunity for product ABC" and removes the entry 406 for the "Test email" e-mail from the display 400. Additionally, the virtual application 220 may modify the activity association fields of the "John Smith" "contact" object and/or the "Acme opportunity for product ABC" "opportunity" object to indicate the association with the "Test email" "activity" object.

Figure 8:
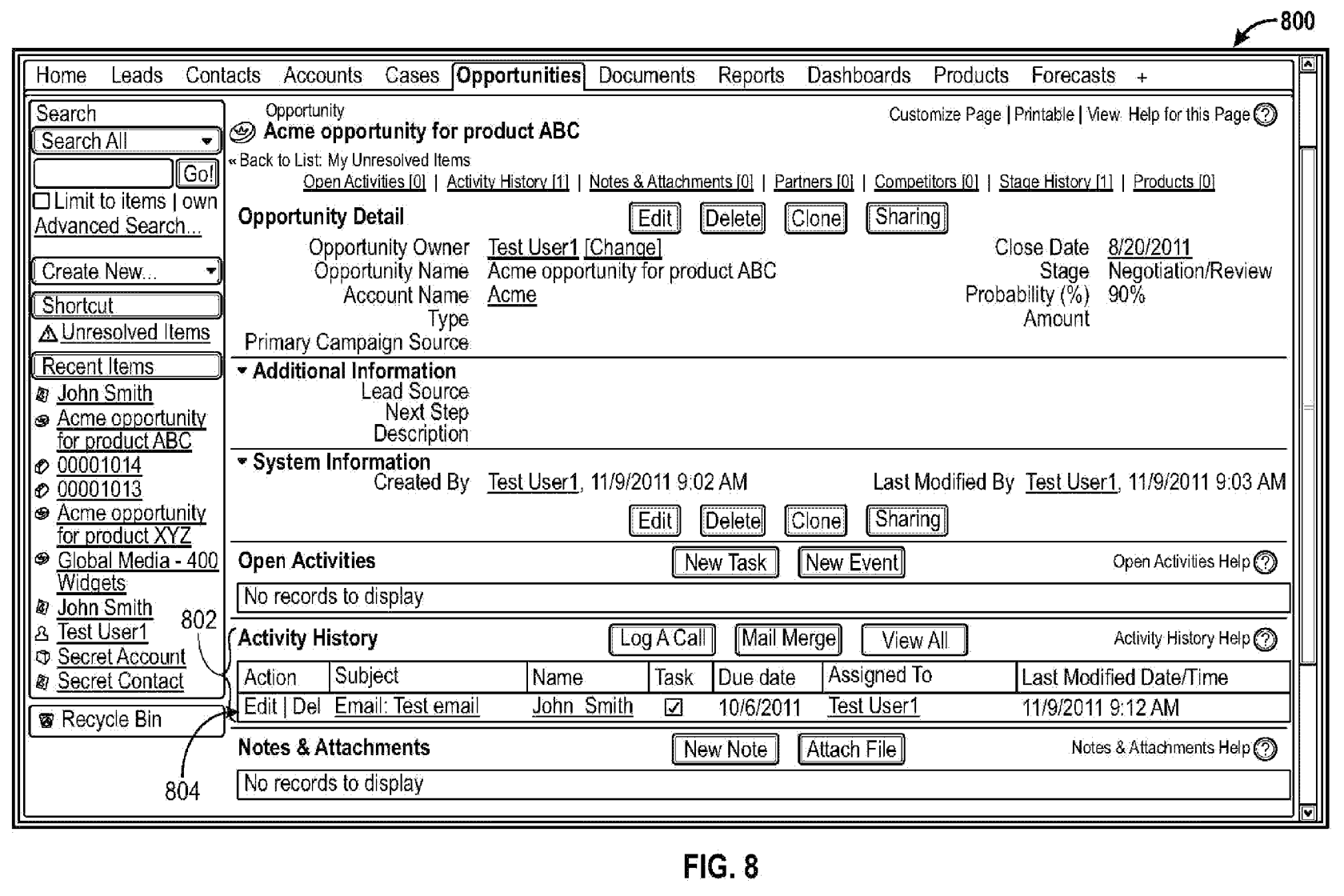

Turning now to FIG. 8, after associating an "activity" object with one or more database objects, the virtual application 220 may graphically indicate the association between the "activity" object and a respective database object when the user views that respective "activity" object or one of its associated database objects within the virtual application 220. For example, the user may manipulate the virtual application 220 to display detailed information for the "Acme opportunity for product ABC" "opportunity" object, wherein the virtual application 220 obtains some or all of the fields of data associated with the "Acme opportunity for product ABC" and presents a display 800 within the browser application 210 on the client device 206 that includes graphical representations of one or more fields of the "Acme opportunity for product ABC." As illustrated, the display 800 includes a region 802 for any "activity" objects associated with the database object currently being displayed. Based on the activity association field of the "Acme opportunity for product ABC" "opportunity" object maintained by the multi-tenant database 204, the virtual application 220 identifies the "Test email" "activity" object as being associated with the "Acme opportunity for product ABC" and updates the region 802 to include an entry 804 corresponding to the "Test email" "activity" object. In the illustrated embodiment, the virtual application 220 obtains one or more fields of data for the "Test email" "activity" object from the multi-tenant database 204 and displays a graphical representation of those fields within the entry 804 for the "Test email" e-mail object. In this regard, the virtual application 220 graphically indicates that "John Smith" is associated with the "Test email" based on the contact association field of the "Test email" "activity" object indicating an association with the "John Smith" "contact" object.

It will be appreciated that the foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, multi-tenancy, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of associating objects in a database, the method comprising:
    instantiating an activity object in the database that corresponds to data obtained from a first application associated with a user of a client device;
    providing, within a second application on the client device, a first graphical user interface element enabling indication of a contact object in the database; and
    after receiving indication of the contact object by the first graphical user interface element:
        associating the activity object with the contact object in the database by modifying a contact association field of the activity object to indicate the contact object;
        identifying one or more objects in the database that are likely to be related to the activity object in the database based on the contact object;
        providing, within the second application on the client device, a second graphical user interface element displaying the one or more objects and enabling indication of an opportunity object from among the one or more objects; and
        after receiving indication of the opportunity object of the one or more objects by the second graphical user interface element, associating the activity object with the opportunity object in the database by modifying an opportunity association field of the activity object to indicate the opportunity object.

2. The method of claim 1, wherein displaying the one or more objects comprises displaying, within the second application, a list including the one or more objects in response to selection of the second graphical user interface element.

3. The method of claim 2, wherein:
identifying the one or more objects comprises identifying a set of objects in the database associated with the contact object; and
the list includes the set of objects in response to selection of the second graphical user interface element after receiving indication of the contact object.

4. The method of claim 3, further comprising graphically indicating an association between the activity object, the contact object, and the opportunity object within the second application.

5. The method of claim 1, further comprising graphically indicating an association between the activity object and the opportunity object within the second application.

6. The method of claim 1, the contact object comprising a primary database object for association with the activity object, wherein identifying the one or more objects comprises identifying a set of objects in the database associated with the primary database object.

7. The method of claim 6, the opportunity object comprising a secondary database object for association with the activity object, wherein associating the activity object and the opportunity object comprises associating the activity object, the primary database object, and the secondary database object after receiving, via the second graphical user interface element, indication of the secondary database object from among the set of objects.

8. The method of claim 7, wherein:
the database comprises a multi-tenant database;
the first application comprises an e-mail application executing on the client device, the activity object being based on an e-mail obtained from the e-mail application; and
the second application comprises a virtual customer relationship management application provided within a browser application executing on the client device.

9. The method of claim 1, wherein identifying the one or more objects in the database that are likely to be related to the activity object in the database based on the contact object comprises querying the database to identify the one or more objects that are associated with the user that are also associated with the contact object.

10. The method of claim 1, wherein the one or more objects have different object types than the contact object.

11. The method of claim 1, wherein instantiating the activity object in the database comprises generating the activity object in the database having fields corresponding to content of the data obtained from the first application.

12. The method of claim 1, wherein:
associating the activity object with the contact object in the database further comprises modifying an activity association field of the contact object to indicate the activity object; and
associating the activity object with the opportunity object in the database comprises modifying an activity association field of the opportunity object to indicate the activity object.

13. A method of associating an activity object in a multi-tenant database in a multi-tenant system providing a virtual application over a network to a plurality of tenants, the method comprising:
instantiating the activity object in the multi-tenant database based on data obtained from a local application executing on a client device;
providing, by the virtual application within a second application executing on the client device, a first graphical user interface element enabling indication of a contact object in the multi-tenant database;
after receiving indication of the contact object by the first graphical user interface element:
associating the activity object with the contact object in the multi-tenant database by modifying a contact association field of the activity object to indicate the contact object;
identifying a set of objects in the multi-tenant database associated with the contact object that are likely to be related to the activity object;
providing, by the virtual application within the second application executing on the client device, a second graphical user interface element enabling indication of an opportunity object of the set of objects;
displaying, by the virtual application within the second application, the set of objects in response to selection of the second graphical user interface element; and
associating the activity object with the opportunity object in the multi-tenant database after receiving indication of the opportunity object from among the set of objects by modifying an opportunity association field of the activity object to indicate the opportunity object.

14. The method of claim 13, wherein identifying the set of objects comprises identifying a plurality of business objects in the multi-tenant database associated with the person object.

15. The method of claim 14, wherein:
identifying the set of objects further comprises identifying a subset of the plurality of business objects based on one or more relevancy criteria; and
displaying the set of objects comprises displaying only the subset of the plurality of business objects.

16. The method of claim 13, further comprising:
displaying, by the virtual application within the second application, a graphical representation of the opportunity object including an entry corresponding to the activity object, wherein the entry indicates an association between the activity object and the contact object.

17. The method of claim 13, further comprising displaying, by the virtual application within the second application, a graphical representation of the opportunity object, wherein the graphical representation of the opportunity object indicates an association with the activity object.

18. A computer system comprising a processor and a memory, wherein the memory comprises computer-executable instructions that, when executed by the processor, cause the computer system to:
instantiate an activity object in a database coupled to the computer system based on data obtained from a first application associated with a user;
provide, within a second application on a client device associated with the user, a first graphical user interface element enabling indication of a contact object in the database, the client device being coupled to the computer system over a network; and
after receiving indication of the contact object by the first graphical user interface element:
associate the activity object with the contact object in the database by modifying a contact association field of the activity object to indicate the contact object;

identify one or more objects in the database that are likely to be related to the activity object in the database based on the contact object;

provide, within the second application executing on the client device associated with the user, a second graphical user interface element enabling indication of an opportunity object from among the one or more objects, wherein the one or more objects are displayed within the second application in response to selection of the first graphical user interface element; and associate the activity object with the opportunity object in the database after receiving indication of the opportunity object from among the one or more objects by the second graphical user interface element by modifying an opportunity association field of the activity object to indicate the opportunity object.

* * * * *